W. WARWICK.
Tea-Kettle.

No. 224,118.    Patented Feb. 3, 1880.

Attest:
Courtney A. Cooper.
William Paxton.

Inventor:
Wm Warwick
By his attorney
Charles E. Foster

UNITED STATES PATENT OFFICE.

WILLIAM WARWICK, OF PITTSBURG, PENNSYLVANIA.

TEA-KETTLE.

SPECIFICATION forming part of Letters Patent No. 224,118, dated February 3, 1880.

Application filed July 7, 1879.

*To all whom it may concern:*

Be it known that I, WILLIAM WARWICK, of Pittsburg, Allegheny county, State of Pennsylvania, have invented a new and useful Improvement in Tea-Kettles, of which the following is a specification.

The object of my invention is a tea-kettle constructed, as fully described hereinafter, so as to prevent scalding of the hands, facilitate handling and replenishing, and prevent the improper detaching of the lid.

Figure 1:
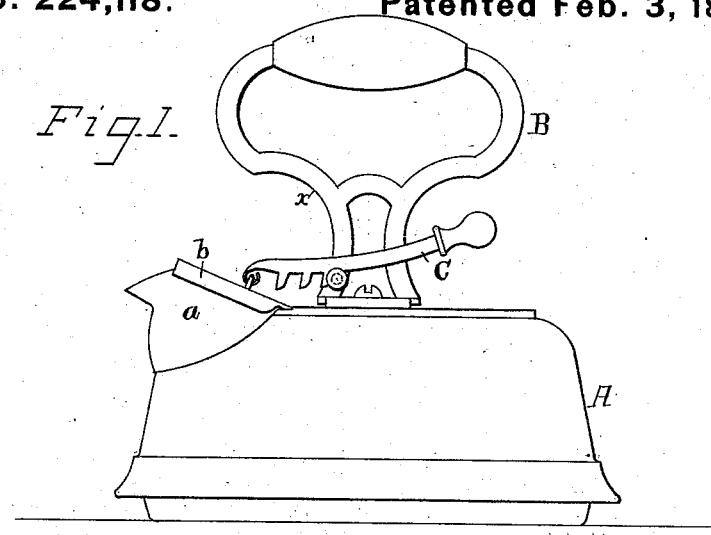
Figure 2:
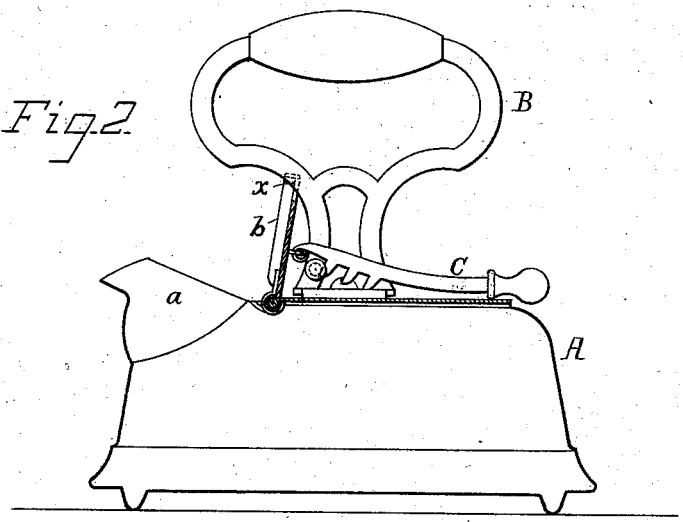
Figure 3:
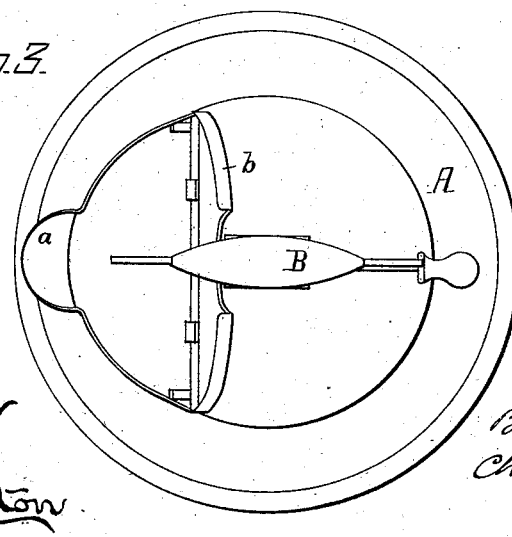

In the drawings forming part of this specification, Figure 1 is a side view of my improved kettle; Fig. 2, a section; Fig. 3, a plan.

As is well known, the position of the mouth or opening directly below the handle in ordinary tea-kettles frequently results in scalding the hands, the contracted spout is apt to become clogged, the lids are easily lost and cannot be packed in the kettle, and the kettle swings on the pivoted handle in moving it.

I overcome these objections by constructing the body A of the kettle with a continuous closed top at the center, with a wide lip or spout, *a*, extending from one side and open at the top, with a lid, *b*, fitting the top of the spout, and with a handle, B, secured to the body out of line with the open top of the spout.

The lid may be secured by pivots or may be loosely adapted to the spout. I prefer the pivoted or hinged construction shown in the drawings, the handle B being formed with an edge, *x*, curved to permit the lid to swing back, but so as to prevent it being lifted to disconnect the hinges until the handle is detached for package or transportation. Both handle and lid, owing to the irregular shape of the latter, may be placed inside of the kettle.

The handle is rigidly but detachably secured in any suitable manner, so that the body cannot swing on the same; but it may, if desired, be pivoted; and the lid is provided with a hinged notched arm, C, or other device, by which it may be set at any desired angle.

As the handle is out of line with the opening the steam cannot reach the hand. The lid, when open, deflects the steam, and the handle, being always upright, will not so readily become heated as when it lies against the body. If necessary, a non-conducting substance may be interposed between the handle and the body.

I am aware that kettles having lids hinged at the center of the top have been provided with bails or handles directly over said hinges; but it will be apparent that the hand, when grasping the bail in such case, will be partly above the opening, while in my improved kettle the grasp or position of the hand is wholly to one side of the opening.

I claim—

1. The combination, in a tea-kettle, of a body closed centrally at the top, a handle secured to the top, and a spout open at the top, provided with a cover, and arranged with its opening wholly to one side of that portion of the handle grasped by the hand, substantially as set forth.

2. A kettle provided with a handle for grasping it centrally over the top, and with its opening and cover wholly to one side of said central grasp, as and for the purpose set forth.

In testimony whereof I have signed my name to this specification in the presence of two subscribing witnesses.

WILLIAM WARWICK.

Witnesses:
J. H. STEVENSON,
D. H. JONES.